(12) United States Patent
Zhou et al.

(10) Patent No.: US 12,009,547 B2
(45) Date of Patent: Jun. 11, 2024

(54) BATTERY CELL, BATTERY, ELECTRICAL DEVICE, AND BATTERY CELL MANUFACTURING METHOD AND DEVICE

(71) Applicant: CONTEMPORARY AMPEREX TECHNOLOGY CO., LIMITED, Ningde (CN)

(72) Inventors: Wenlin Zhou, Ningde (CN); Yulian Zheng, Ningde (CN); Xinxiang Chen, Ningde (CN); Liangfan Xu, Ningde (CN); Peng Wang, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 419 days.

(21) Appl. No.: 17/564,598

(22) Filed: Dec. 29, 2021

(65) Prior Publication Data
US 2022/0384916 A1    Dec. 1, 2022

Related U.S. Application Data

(63) Continuation of application No. PCT/CN2021/096943, filed on May 28, 2021.

(51) Int. Cl.
*H01M 50/00* (2021.01)
*H01M 50/147* (2021.01)
*H01M 50/536* (2021.01)

(52) U.S. Cl.
CPC ....... *H01M 50/536* (2021.01); *H01M 50/147* (2021.01); *H01M 2220/20* (2013.01)

(58) Field of Classification Search
CPC .......................... H01M 50/536; H01M 50/147
See application file for complete search history.

(56) References Cited

U.S. PATENT DOCUMENTS

| 10,050,241 B2 | 8/2018 | Park et al. |
| 10,644,300 B2 | 5/2020 | Xing et al. |

(Continued)

FOREIGN PATENT DOCUMENTS

| CN | 107615520 A | * | 1/2018 | ............ H01G 11/74 |
| CN | 108615830 A |   | 10/2018 | |

(Continued)

OTHER PUBLICATIONS

Zhu et al., A Secondary Battery, May 2020, See the Abstract. (Year: 2020).*

(Continued)

*Primary Examiner* — Cynthia H Kelly
*Assistant Examiner* — Monique M Wills
(74) *Attorney, Agent, or Firm* — Scully, Scott, Murphy & Presser, P.C.

(57) ABSTRACT

The embodiments of this application provide a battery cell, a battery, an electrical device, and a battery cell manufacturing method and device, which pertains to the technical field of batteries. The battery cell includes an electrode assembly, a housing, an end cover assembly, and a support piece. The electrode assembly includes a main body and tabs. The housing has an opening and is used to accommodate the electrode assembly. The end cover assembly is used to cover the opening. The support piece is located between the main body and the end cover assembly, the tabs are bent around the support piece, and the support piece is configured to prevent the main body from moving along a direction facing the end cover assembly.

13 Claims, 6 Drawing Sheets

(56) References Cited

U.S. PATENT DOCUMENTS

| | | |
|---|---|---|
| 10,651,498 B2 | 5/2020 | Li et al. |
| 10,998,534 B2 | 5/2021 | Lee et al. |
| 2016/0099444 A1 | 4/2016 | Park et al. |
| 2018/0166676 A1 | 6/2018 | Xing et al. |
| 2019/0221877 A1 | 7/2019 | Li et al. |
| 2019/0296272 A1 | 9/2019 | Lee et al. |
| 2020/0091484 A1 | 3/2020 | Guen |
| 2021/0043912 A1 | 2/2021 | Zhu et al. |
| 2021/0242549 A1 | 8/2021 | Zheng et al. |
| 2021/0249723 A1 | 8/2021 | Zheng et al. |
| 2022/0006163 A1 | 1/2022 | Yang |

FOREIGN PATENT DOCUMENTS

| | | | |
|---|---|---|---|
| CN | 209344216 U | 9/2019 | |
| CN | 110299502 A | 10/2019 | |
| CN | 110679005 A | 1/2020 | |
| CN | 111106304 A * | 5/2020 | ............ H01M 10/04 |
| CN | 111106304 A | 5/2020 | |
| CN | 111785901 A | 10/2020 | |
| CN | 112467231 A | 3/2021 | |
| CN | 112771714 A | 5/2021 | |
| WO | 2021023060 A1 | 2/2021 | |
| WO | 2021102638 A1 | 6/2021 | |

OTHER PUBLICATIONS

Hirose et al., Manufacturing Method Of Storage Device And Storage Device, Jan. 2018, See the Abstract. (Year: 2018).*
Notification to Grant Patent Right for Invention dated Oct. 16, 2023 received in Chinese Patent Application No. CN 202180013786.9.
Extended European Search Report dated Dec. 19, 2022 received in European Patent Application No. EP 21806607.4.

* cited by examiner

BATTERY CELL, BATTERY, ELECTRICAL DEVICE, AND BATTERY CELL MANUFACTURING METHOD AND DEVICE

CROSS-REFERENCE TO RELATED APPLICATIONS

This application is a continuation of International Application No. PCT/CN2021/096943, filed on May 28, 2021, the disclosure of which is hereby incorporated by reference in its entirety.

TECHNICAL FIELD

This application relates to the technical field of batteries, and more specifically, to a battery cell, a battery, an electrical device, and a battery cell manufacturing method and device.

BACKGROUND

Batteries are widely used in electronic devices, such as mobile phones, notebook computers, storage battery cars, electric vehicles, electric airplanes, electric ships, electric toy cars, electric toy ships, electric toy airplanes, and electric tools.

In the development of battery technologies, in addition to improving battery performance, safety problem is also a problem that cannot be ignored. Therefore, how to improve the safety of the battery is a technical problem that needs to be resolved urgently in battery technologies.

SUMMARY

The embodiments of this application provide a battery cell, a battery, an electrical device, and a battery cell manufacturing method and device, which can effectively improve the safety of the battery.

According to a first aspect, an embodiment of this application provides a battery cell, including: an electrode assembly, including a main body and tabs; a housing with an opening; where the housing is used to accommodate the electrode assembly; an end cover assembly used to cover the opening; and a support piece located between the main body and the end cover assembly, where the tabs are bent around the support piece, and the support piece is configured to prevent the main body from moving along a direction facing the end cover assembly.

In the foregoing technical solution, the support piece is located between the main body and the end cover assembly, the tabs are bent around the support piece, and the support piece serves to restrict the main body and the tabs of the electrode assembly to prevent the main body from moving along the direction facing the end cover assembly, which effectively reduces a risk of short circuit between a positive electrode and a negative electrode caused by the tabs inserted into the main body due to the main body moving up and down in the housing, thereby improving safety of the battery cell.

In some embodiments, the support piece includes: a support portion for abutting against the main body along a thickness direction of the end cover assembly; and the tabs are bent around a partition portion, and in a width direction of the end cover assembly, the partition portion is connected to one end of the support portion.

In the foregoing technical solution, the support portion abuts against the main body, and the support portion serves to restrict the main body to prevent the main body from moving along a direction facing the end cover assembly. The partition portion is connected to one end of the support portion, so that the tabs can be conveniently bent and arranged on the partition portion, and the partition portion serves to restrict the tabs and prevents the tabs from being inserted into the main body.

In some embodiments, a projected area of the support portion is larger than a projected area of the partition portion in the thickness direction of the end cover assembly.

In the foregoing technical solution, the projected area of the support portion in the thickness direction of the end cover assembly is larger than the projected area of the partition portion in the thickness direction of the end cover assembly, so that the support portion has a relatively large support range between the end cover assembly and the main body. It is ensured that the support portion has a good supporting capacity between the main body and the end cover assembly, thereby preventing the support portion from damaging the main body.

In some embodiments, a size of the support portion is larger than a size of the partition portion in the thickness direction of the end cover assembly.

In the foregoing technical solution, the size of the support portion in the thickness direction of the end cover assembly is greater than the size of the partition portion in the thickness direction of the end cover assembly, that is, the thickness of the support portion is thicker than that of the partition portion. The support portion is relatively thicker, so that the support portion is not easily deformed, and it is further ensured that the support portion has a better supporting capacity between the main body and the end cover assembly. The relatively thinner partition portion enables the tabs to have a shorter detour path, which is convenient for the tabs to be bent and arranged on the partition portion.

In some embodiments, one side of the support piece facing the end cover assembly has a reinforcement portion, and the reinforcement portion is used to enhance strength of the support piece.

In the foregoing technical solution, the side of the support piece facing the end cover assembly has a reinforcement portion to enhance the strength of the support piece, so that the support portion is not easily deformed when the main body abuts against the support portion, thereby improving the supporting capacity of the support piece between the main body and the end cover assembly.

In some embodiments, the projected area of the support portion is larger than ⅓ of a projected area of the support piece in the thickness direction of the end cover assembly.

In the foregoing technical solution, the projected area of the support portion in the thickness direction of the end cover assembly is larger than ⅓ of the projected area of the support piece in the thickness direction of the end cover assembly, that is, ⅓ of the support piece can support the main body. A contradiction area between the support piece and the main body is relatively large, thereby improving stability of the main body in the housing.

In some embodiments, the electrode assembly includes two tabs with opposite polarities, and the two tabs are arranged side by side along a length direction of the end cover assembly; the partition portion includes a first part and a second part arranged side by side along the length direction of the end cover assembly, and the two tabs are bent around the first part and the second part respectively; and the support piece further includes a connection portion located between the first part and the second part, and the connection portion is used to isolate the two tabs.

In the foregoing technical solution, the connection portion between the first part and the second part can isolate the two tabs with opposite polarities of the electrode assembly, and reduce a risk of short circuit caused by contact between the two tabs.

In some embodiments, the connection portion is used to abut against the main body in the thickness direction of the end cover assembly.

In the foregoing technical solution, the connection portion abuts against the main body in the thickness direction of the end cover assembly, and the connection portion not only serves to isolate the two tabs of the electrode assembly, but also supports the main body, and improves the stability of the main body in the housing.

In some embodiments, the battery cell includes a plurality of the electrode assemblies stacked along the width direction of the end cover assembly; and in the width direction of the end cover assembly, both ends of the support portion are provided with the partition portion, tabs of one group of the pluralities of electrode assemblies are bent around the partition portion located at one end of the support portion, and tabs of another group of electrode assemblies are bent around the partition portion located at the other end of the support portion.

In the foregoing technical solution, tabs of one group of the pluralities of electrode assemblies are bent around the partition portion located at one end of the support portion, and tabs of another group of electrode assemblies are bent around the partition portion located at the other end of the support portion. In other words, the support piece may serve to restrict the tabs of the pluralities of electrode assemblies, which improves the safety of the battery.

In some embodiments, the tabs include: a first bending portion, where the first bending portion is located on a side of the partition portion facing the main body; and a second bending portion connected to the first bending portion and bent relative to the first bending portion, where the second bending portion is located on a side of the partition portion departing from the main body.

In the foregoing technical solution, the first bending portion and the second bending portion connected to each other are respectively located on a side of the partition portion facing the main body and a side of the partition portion departing from the main body. In other words, that the tabs are bent around the partition portion refers to be bent from one side of the partition portion to the other side of the partition portion. The partition portion has a good restrictive effect on the tabs, so that the tabs are not easily inserted into the main body.

In some embodiments, the support portion has a first surface facing the main body, and the first surface is configured to abut against the main body; and the partition portion has a second surface facing the main body, and in the thickness direction of the end cover assembly, the second surface is configured to be farther from the main body than the first surface to form an accommodation portion, and at least a part of the first bending portion is accommodated in the accommodation portion.

In the foregoing technical solution, the second surface of the partition portion is farther from the main body than the first surface of the support portion to form the accommodation portion, and at least a part of the first bending portion is accommodated in the accommodation portion, so that the first surface abuts against the main body. In addition, the space occupied by the first bending portion can be reduced, thereby increasing the energy density of the battery cell.

In some embodiments, the second surface is attached to the first bending portion.

In the foregoing technical solution, the second surface is attached to the first bending portion to eliminate a gap between the first bending portion and the second surface, so that a structure of the tabs and the partition portion is more compact.

In some embodiments, the accommodation portion extends to an edge of the partition portion along the width direction of the end cover assembly.

In the foregoing technical solution, the accommodation portion extends to the edge of the partition portion along the width direction of the end cover assembly, so that the first bending portion is accommodated in the accommodation portion when the tabs are bent around the partition portion.

In some embodiments, the end cover assembly is provided with a first recessed portion facing the main body, and the first recessed portion is configured to accommodate at least a part of the support piece.

In the foregoing technical solution, at least a part of the support piece is accommodated in the first recess, which may reduce the space occupied by the support piece inside the housing, so as to make more space for the main body of the electrode assembly, which is beneficial to increase the energy density of the battery cell.

In some embodiments, the first recessed portion is configured to accommodate at least a part of the tabs.

In the foregoing technical solution, at least a part of the tabs is accommodated in the first recessed portion, which may reduce the space occupied by the tabs inside the housing, and is beneficial to increase the energy density of the battery cell.

In some embodiments, the end cover assembly includes: an end cover used to cover the opening; and an insulating piece disposed on a side of the end cover facing the main body, where the insulating piece is configured to isolate the end cover from the electrode assembly, the first recessed portion is disposed on the insulating piece, the support piece is located between the insulating piece and the main body, and the support piece abuts against the insulating piece and the main body.

In the foregoing technical solution, the insulating piece is disposed on one side of the end cover facing the main body. The insulating piece serves to separate the end cover and the electrode assembly, and reduce the risk of battery cell short circuit caused by contact between the end cover and the electrode assembly. The support piece is located between the insulating piece and the main body and abuts against the insulating piece and the main body. The support piece may prevent the insulating piece and the main body from approaching each other, and the main body is not easy to move up and down in the housing.

In some embodiments, the insulating piece includes a first body portion, where the first body portion has a first inner surface and a first outer surface that are arranged opposite to each other in the thickness direction of the end cover assembly; and a first protruding portion, where the first protruding portion protrudes from the first outer surface along a direction departing from the main body, and the first recessed portion recessed from the first inner surface in the direction departing from the main body is formed at a position corresponding to the first protruding portion on the first body portion; and the end cover is provided with a second recessed portion facing the main body, and the second recessed portion is used to accommodate at least a part of the first protruding portion.

In the foregoing technical solution, on the one hand, the arrangement of the first protruding portion of the insulating piece may strengthen the position where the first recessed portion is disposed on the first body portion; on the other hand, the first recessed portion may be allowed to be recessed in the direction departing from the main body as far as possible. In addition, since at least a part of the first protruding portion is accommodated in the second recessed portion of the end cover, this structure enables the structure of the insulating piece and the end cover to be more compact, so as to make more space for the main body of the electrode assembly, which is beneficial to increase the energy density of the battery cell.

In some embodiments, in the thickness direction of the end cover assembly, a bottom surface of the first recessed portion is farther from the main body than the first outer surface.

In the foregoing technical solution, the bottom surface of the first recessed portion is farther from the main body than the first outer surface, so that the first recessed portion is recessed into the first protruding portion in the direction departing from the main body, which increases a recess depth of the first recessed portion.

In some embodiments, the end cover includes: a second body portion, where the second body portion has a second inner surface and a second outer surface that are arranged opposite to each other in the thickness direction of the end cover assembly, and the second inner surface faces the first outer surface; and a second protruding portion, where the second protruding portion protrudes from the second outer surface along the direction departing from the main body, and the second recessed portion recessed from the second inner surface in the direction departing from the main body is formed at a position corresponding to the second protruding portion on the second body portion.

In the foregoing technical solution, on the one hand, the arrangement of the second protruding portion of the end cover may strengthen the position where the second recessed portion is disposed on the second body portion; on the other hand, the second recessed portion may be allowed to be recessed in the direction departing from the main body as far as possible.

In some embodiments, in the thickness direction of the end cover assembly, a bottom surface of the second recessed portion is farther from the main body than the second outer surface.

In the foregoing technical solution, the bottom surface of the second recessed portion is farther from the main body than the second outer surface, so that the second recessed portion is recessed into the second protruding portion in the direction departing from the main body, which increases a recess depth of the second recessed portion.

According to a second aspect, an embodiment of this application provides a battery, including the battery cell according to any embodiment of the first aspect; and a box body used to accommodate the battery cell.

According to a third aspect, an embodiment of this application provides an electrical device, including the battery according to any embodiment of the second aspect.

According to a fourth aspect, an embodiment of this application provides a battery cell manufacturing method, where the method includes: providing an electrode assembly, where the electrode assembly includes a main body and tabs; providing a housing with an opening; providing an end cover assembly; providing a support piece; bending the tabs around the support piece; accommodating the electrode assembly in the housing; and covering the opening with the end cover assembly, where the support piece is located between the end cover assembly and the main body, and the support piece is configured to prevent the main body from moving along a direction facing the end cover assembly.

According to a fifth aspect, an embodiment of this application provides a battery cell manufacturing device, including: a first providing apparatus used to provide an electrode assembly, where the electrode assembly includes a main body and tabs; a second providing apparatus used to provide a housing with an opening; a third providing apparatus used to provide an end cover assembly; a fourth providing apparatus used to provide a support piece; and an assembling apparatus used to bend the tabs around the support piece and cover the opening with the end cover assembly, where the support piece is located between the end cover assembly and the main body, and the support piece is configured to prevent the main body from moving along a direction facing the end cover assembly.

BRIEF DESCRIPTION OF DRAWINGS

To illustrate the technical solutions in the embodiments of this application more clearly, the following will briefly introduce the drawings that need to be used in the embodiments. It should be understood that the drawings described below show only some embodiments of this application and should not be regarded as a limitation of scope, and for a person of ordinary skill in the art, other related drawings may also be obtained based on these drawings without creative work.

DESCRIPTION OF EMBODIMENTS

Figure 1:
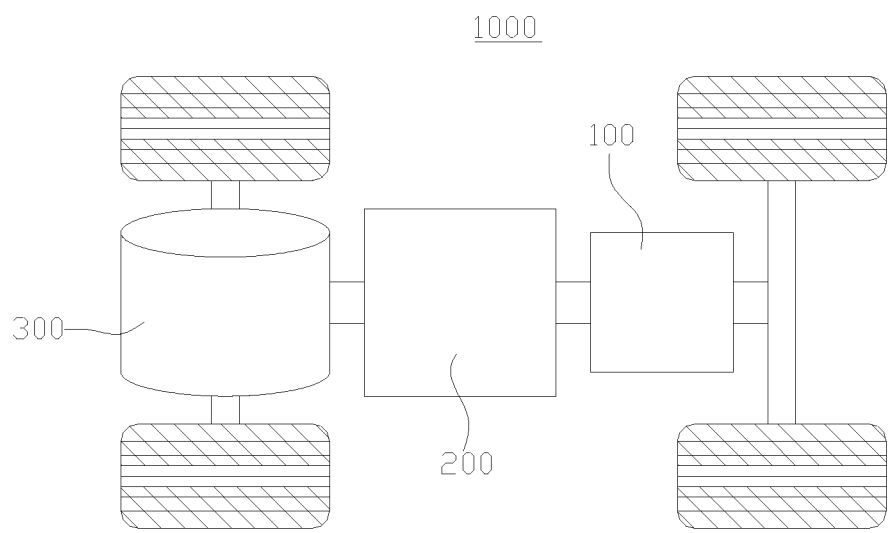
FIG. 1 is a schematic structural diagram of a vehicle according to some embodiments of this application.

To make objectives, technical solutions, and advantages of the embodiments of this application clearer, the technical solutions in the embodiments of this application will be clearly described below in combination with the accompanying drawings in the embodiments of this application. Obviously, the described embodiments are a part of the embodiments of this application, rather than all of the embodiments. Based on the embodiments in this application, all other embodiments obtained by a person of ordinary skill in the art without creative work shall fall within the protection scope of this application.

Unless otherwise defined, all technical and scientific terms used in this application have the same meaning as those commonly understood by those skilled in the technical field of this application; the terms used in the specification of this application are only for describing specific embodiments, and are not intended to restrict this application; the terms "include" and "have" in the specification and claims of this application and in the foregoing brief description of the drawings and any variations thereof are intended to cover non-exclusive inclusions. Terms "first", "second", and the like in the specification and claims of this application or in the foregoing drawings are used to distinguish different objects, rather than to describe a specific order or primary-secondary relationship.

The "embodiment" in this application means that specific features, structures, or characteristics described in combination with the embodiments may be included in at least one embodiment of this application. The phrase existing in different places of the specification does not necessarily refer to the same embodiment, nor is it an independent or alternative embodiment mutually exclusive with other embodiments.

In the description of this application, it should be noted that, unless specifically defined and limited otherwise, the terms "install", "link", "connect", and "attach" should be understood in a broad sense, for example, it may be a fixed connection, a detachable connection, or integral connection; it may be a direct link or an indirect link through an intermediary, and it can be an internal connection between two elements. For a person of ordinary skill in the art, the specific meanings of the foregoing terms in this application may be understood according to specific circumstances.

The term "and/or" used in this application is only an association relationship describing associated objects, which means that there can be three types of relationships, for example, A and/or B may mean that there is A alone, there are A and B, and there is B alone. In addition, the character "/" in this application usually indicates that the associated objects before and after are in an "or" relationship.

In the embodiments of this application, same signs in the drawings refer to same components, and for brevity, detailed descriptions of the same component are omitted in different embodiments. It should be understood that thickness, length, width and other dimensions of components in the embodiments of this application shown in the drawings, as well as overall thickness, length, and width of an integrated apparatus are only an example of descriptions, and should not constitute any limitation to this application.

"A plurality of" in this application refers to two or more (including two).

In this application, the battery cell may include a lithium ion secondary battery, a lithium ion primary battery, a lithium sulfur battery, a sodium lithium ion battery, a sodium ion battery, a magnesium ion battery, or the like. The embodiments of this application set no limitation thereto. The battery cell may be cylindrical, flat, rectangular, or in other shapes. The embodiments of this application also set no limitation thereto. The battery cells are usually divided into three types according to encapsulation methods: a cylindrical battery cell, a square battery cell, and a soft pack battery cell. The embodiments of this application set no limitation thereto.

The battery mentioned in the embodiments of this application refers to a single physical module that includes one or more battery cells to provide higher voltage and capacity. For example, the battery mentioned in this application may include a battery module, a battery pack, or the like. The battery usually includes a box body for encapsulating one or more battery cells. The box body may prevent liquid or other foreign matters from affecting charging or discharging of the battery cell.

The battery cell includes an electrode assembly and an electrolyte solution. The electrode assembly includes a positive electrode plate, a negative electrode plate, and an isolating membrane. The battery cell mainly operates by metal ions moving between the positive electrode plate and the negative electrode plate. The positive electrode plate includes positive current collectors and positive active substance layers. The positive active substance layer is coated on a surface of the positive current collector. Taking a lithium ion battery as an example, material of the positive current collector may be aluminum, and the positive active substance may be lithium cobaltate, lithium iron phosphate, ternary lithium, lithium manganate, or the like. The negative electrode plate includes negative current collectors and negative active substance layers. The negative active substance layer is coated on a surface of the negative current collector, and a negative current collector that is not coated with the negative active substance layer protrudes from the negative current collector that has been coated with the negative active substance layer. Material of the negative current collector may be copper, and negative active substance may be carbon, silicon, or the like. Material of the isolating membrane may be PP (polypropylene), PE (polyethylene, or the like. In addition, the electrode assembly may be in a winding structure or a laminated structure. This is not limited in the embodiments of this application.

Many design factors should also be considered in development of battery technologies, for example, energy density, cycle life, discharge capacity, charge and discharge rate, and other performance parameters. In addition, the safety of the battery also needs to be considered.

The inventor found that there is a risk of short circuit for general battery cells, which affects the safety of the battery cells. Through further research, the inventor found that in the battery cell, to achieve bending assembly of the tabs, a certain space needs to be left between the end cover assembly and the main body of the electrode assembly. As a result, the main body of the electrode assembly is prone to move up and down, which makes it easy for the tabs to be inserted into the main body, resulting in a short circuit between a positive electrode and a negative electrode, thereby affecting the safety of the battery cell.

In view of this, the embodiments of this application provide a technical solution by providing a support piece between the main body of the electrode assembly and the end cover assembly, the tabs are bent around the support piece, and the support piece serves to prevent the main body from moving along a direction facing the end cover assembly, which effectively reduces a risk of short circuit between a positive electrode and a negative electrode caused by the tabs inserted into the main body due to the main body moving up and down in the housing, thereby improving safety of the battery cell.

The technical solutions described in the embodiments of this application are applicable to battery cells, batteries, and electrical devices using batteries.

The electrical devices may be vehicles, mobile phones, portable devices, notebook computers, ships, spacecrafts, electric toys, electric tools, and the like. The vehicles may be fuel vehicles, gas vehicles or new energy vehicles, the new energy vehicles may be pure electric vehicles, hybrid vehicles, extended-range vehicles, or the like; the spacecrafts include airplanes, rockets, space shuttles, spacecrafts, and the like; the electric toys include fixed or mobile electric toys such as game consoles, electric car toys, electric ship toys, electric airplane toys, and the like; the electric tools include metal cutting electric tools, grinding electric tools, assembly electric tools, and railway electric tools, for example, electric drills, electric grinders, electric wrenches, electric screwdrivers, electric hammers, electric impact drills, concrete vibrators, and electric planers. The embodiments of this application set no special limitation on the foregoing electrical devices.

For ease of description, in the following embodiments, a vehicle is used as the electric device for description.

Please refer to FIG. 1, FIG. 1 is a schematic structural diagram of a vehicle 1000 according to some embodiments of this application. A battery 100 is provided inside the vehicle 1000, and the battery 100 may be disposed on the bottom, head, or tail of the vehicle 1000. The battery 100 may be used to supply power to the vehicle 1000, for example, the battery 100 may be used as an operating power source of the vehicle 1000.

The vehicle 1000 may further include a controller 200 and a motor 300. The controller 200 is used to control the battery 100 to supply power to the motor 300, for example, used to meet working power requirements of the vehicle 1000 during starting, navigating, and driving.

In some embodiments, the battery 100 may be used not only as the operating power source for the vehicle 1000, but also as a driving power source for the vehicle 1000, replacing or partially replacing fuel or natural gas to provide driving power for the vehicle 1000.

Figure 2:
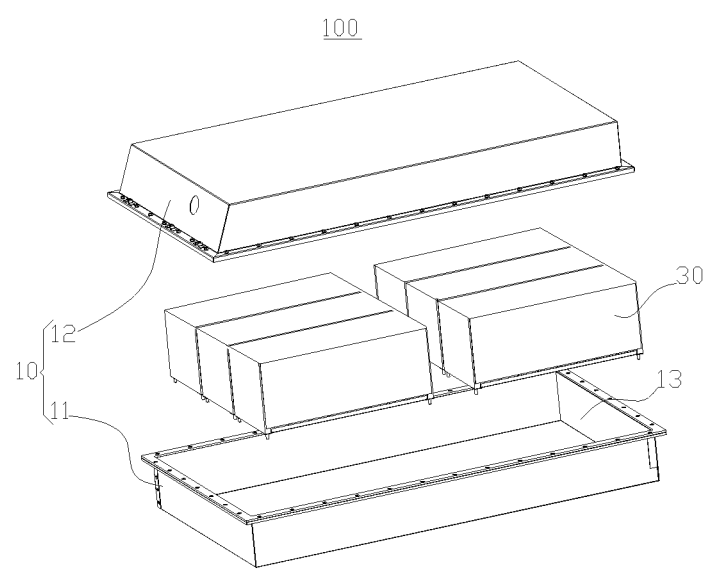
FIG. 2 is a schematic structural diagram of a battery according to some embodiments of this application.

In some embodiments, please refer to FIG. 2, FIG. 2 is a schematic structural diagram of a battery 100 according to some embodiments of this application. The battery 100 includes a box body 10 and a battery cell 20 (not shown in FIG. 2), and the battery cell 20 is accommodated in the box body 10.

The box body 10 is used to accommodate the battery cell 20. The box body 10 may be in various shapes, such as a cylinder or a cuboid.

In some embodiments, the box body 10 may include a lower box body 11 and an upper box body 12, and the lower box body 11 and the upper box body 12 are covered with each other to define an accommodation space 13 for accommodating the battery cell 20. Certainly, a connection between the lower box body 11 and the upper box body 12 may be sealed by a sealing element, and the sealing element may be a sealing ring, a sealant, or the like.

The lower box body 11 and the upper box body 12 may be in various shapes, such as a cuboid or a cylinder. The lower box body 11 may be in a hollow structure with an opening on one side, and the upper box body 12 may also be in a hollow structure with an opening on one side. The opening side of the upper box body 12 is covered with the opening side of the lower box body 11 to form the box body 10 having the accommodation space 13.

In the battery 100, there may be one or more battery cells 20. If there are a plurality of battery cells 20, the plurality of battery cells 20 may be connected in series or in parallel or in parallel-series. The parallel-series connection means that the plurality of battery cells 20 are both connected in series and in parallel.

Figure 3:
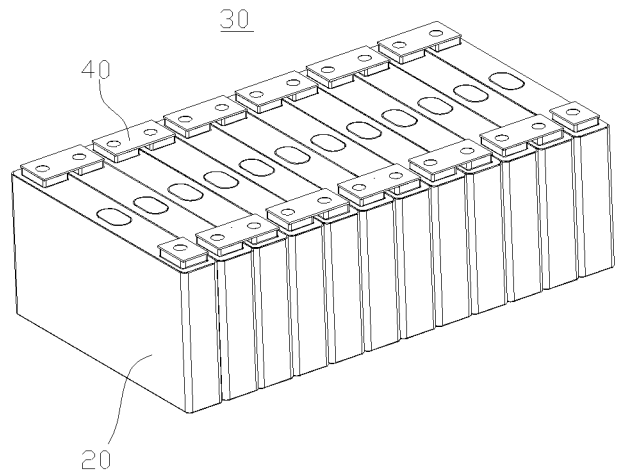
FIG. 3 is a schematic structural diagram of a battery module in FIG. 2.

In some embodiments, please refer to FIG. 3. FIG. 3 is a schematic structural diagram of a battery module 30 shown in FIG. 2. The plurality of battery cells 20 may be connected in series or in parallel or in parallel-series to form the battery module 30, and then the plurality of battery modules 30 are connected in series or in parallel or in parallel-series to form an entirety and is accommodated in the box body 10. In other embodiments, the plurality of battery cells 20 may also be directly connected in series or in parallel or in parallel-series, and then the entirety includes the plurality of battery cells 20 is accommodated in the box body 10.

In some embodiments, the battery 100 may further include a bus component 40, and the plurality of battery cells 20 may be electrically connected through the bus component 40 to realize connection in series or in parallel or in parallel-series of the plurality of battery cells 20.

The bus component 40 may be a metal conductor, such as copper, iron, aluminum, stainless steel, and aluminum alloy.

Figure 4:
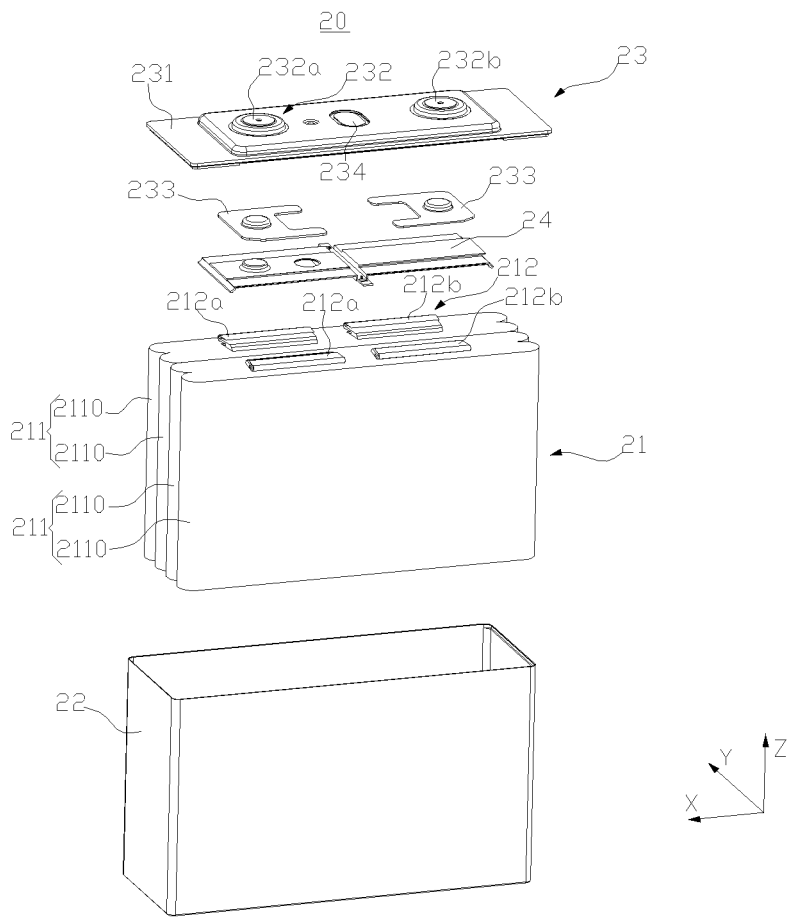
FIG. 4 is an exploded diagram of a battery cell according to some embodiments of this application.

In the embodiments of this application, please refer to FIG. 4. FIG. 4 is an exploded diagram of a battery cell 20 according to some embodiments of this application. The battery cell 20 includes an electrode assembly 21, a housing 22, an end cover assembly 23, and a support piece 24. The electrode assembly 21 includes a main body 211 and tabs 212. The housing 22 has an opening and is used to accommodate the electrode assembly 21. The end cover assembly 23 is used to cover the opening. The support piece 24 is located between the main body 211 and the end cover assembly 23, where the tabs 212 are bent around the support piece 24, and the support piece 24 is configured to prevent the main body 211 from moving along a direction facing the end cover assembly 23.

In the battery cell 20 having the foregoing structure, since the support piece 24 is located between the main body 211 and the end cover assembly 23, the tabs 212 are bent around the support piece 24, and the support piece 24 serves to restrict the main body 211 and the tabs 212 of the electrode assembly 21 to prevent the main body 211 from moving in the direction facing the end cover assembly 23. This effectively reduces the risk of short circuit between a positive electrode and a negative electrode caused by the tabs 212 inserted into the main body 211 due to the main body 211 moving up and down in the housing 22, and improves safety of the battery cell 20.

In addition, the support piece 24 is located between the main body 211 and the end cover assembly 23. The support piece 24 may occupy the space between the end cover assembly 23 and the main body 211, and may reduce the risk that a large amount of electrolyte solution enters the space between the support piece 24 and the end cover assembly 23 when the battery cell 20 is inverted (the end cover assembly 23 of the battery cell 20 faces downward, and the end cover assembly 23 is located at the bottom of the housing 22), causing a lifespan of the battery cell 20 is shortened due to insufficient electrolyte solution in the main body 211.

The support piece 24 is supported between the main body 211 and the end cover assembly 23. The support piece 24 not only abuts against the main body 211, but also abuts against the end cover assembly 23. Certainly, the support piece 24 may directly or indirectly abuts against the main body 211; and the support piece 24 may directly or indirectly abuts against the end cover assembly 23.

There may be one or more electrode assemblies 21.

In some embodiments, the electrode assembly 21 may include at least one electrochemical cell. In other words, there may be one or more electrochemical cells in the electrode assembly 21. When there are a plurality of electrochemical cells in the electrode assembly 21, the plurality of electrochemical cells may be stacked.

The electrochemical cell may include an electrochemical cell body 2110 and a sub-tab. If there is one electrochemical cell in the electrode assembly 21, the electrochemical cell body 2110 is the main body 211 of the electrode assembly 21, and the sub-tab refers to the tabs 212 of the electrode assembly 21; if there are a plurality of electrochemical cells in the electrode assembly 21, the electrochemical cell bodies 2110 of the plurality of electrochemical cells together form the main body 211 of the electrode assembly 21, and the sub-tabs of the plurality of electrochemical cells together form the tabs 212 of the electrode assembly 21. The sub-tab of the electrochemical cell is divided into a positive sub-tab and a negative sub-tab. The tabs 212 of the electrode assembly 21 are divided into a positive tab 212a and a negative tab 212b. If there is one electrochemical cell in the electrode assembly 21, the positive sub-tab of the electrochemical cell is the positive tab 212a of the electrode assembly 21, and the negative sub-tab of the electrochemical cell is the negative tab 212b of the electrode assembly 21; if there are a plurality of electrochemical cells in the electrode assembly 21, the positive sub-tabs of the plurality of electrochemical cells together form the positive tab 212a of the electrode assembly 21, and the negative sub-tabs of the plurality of electrochemical cells together form the negative tab 212b of the electrode assembly 21. For example, in FIG. 4, there are two electrode assemblies 21 inside the housing 22. Each electrode assembly 21 includes two electrochemical cells. The electrochemical cell bodies 2110 of the two electrochemical cells together form the main body 211 of the electrode assembly 21. The positive sub-tabs of the two electrochemical cells together form the positive tab 212a of the electrode assembly 21, and the negative sub-tabs of the two electrochemical cells together form the negative tab 212b of the electrode assembly 21.

The electrochemical cell may include a positive electrode plate, a negative electrode plate, and an isolating membrane. The electrochemical cell may be in a winding structure formed by winding the positive electrode plate, the isolating membrane, and the negative electrode plate. The electrochemical cell may also be in a stacking structure formed by stacking the positive electrode plate, the isolating membrane, and the negative electrode plate.

The positive electrode plate may include a positive current collector and a positive active substance layer coated on opposite sides of the positive current collector. The negative electrode plate may include a negative current collector and a negative active substance layer coated on opposite sides of the negative current collector. The electrochemical cell body 2110 of the electrochemical cell may be a part corresponding to an area where the positive electrode plate and the negative electrode plate are coated with the active substance layer. The positive sub-tab of the electrochemical cell may be a part of the positive electrode plate that is not coated with the positive active substance layer, and the negative sub-tab of the electrochemical cell may be a part of the negative electrode plate that is not coated with the negative active substance layer.

In the electrode assembly 21, the positive tab 212a and the negative tab 212b may be located on a same side of the main body 211, or may be located on opposite sides of the main body 211 respectively. For example, in FIG. 4, the positive tab 212a and the negative tab 212b are located on the same side of the main body 211.

It should be noted that in the embodiments of this application, that the tabs 212 are bent around the support piece 24 may be that the positive tab 212a is bent around the support piece 24, the negative tab 212b is bent around the support piece 24, or both the positive tab 212a and the negative tab 212b are bent around the support piece 24.

It should be noted that the tabs 212 are bent around the support piece 24 means that the tabs 212 may or may not be in contact with the end of the support piece 24.

In the embodiments of this application, the housing 22 may be in various shapes, such as a cylinder or a cuboid. A shape of the housing 22 may be determined according to a specific shape of the electrode assembly 21. For example, if the electrode assembly 21 is in a cylindrical structure, the housing 22 may be in a cylindrical structure; if the electrode assembly 21 is in a cuboid structure, the housing 22 may be in a cuboid structure. For example, in FIG. 4, the housing 22 is in a hollow cuboid structure with one end open.

The housing 22 may also be made of a plurality of materials, such as plastic, copper, iron, aluminum, stainless steel, or aluminum alloy. The embodiments of this application set no special limitation herein.

There may be one or more electrode assemblies 21 in the housing 22. When there are a plurality of electrode assemblies 21 in the housing 22, the plurality of battery cells 20 may be stacked in the housing 22. As shown in FIG. 4, for example, there are two electrode assemblies 21 in the housing 22, and main bodies 211 of the two electrode assemblies 21 are stacked in the housing 22.

In some embodiments, please continue to refer to FIG. 4, the end cover assembly 23 includes an end cover 231, and the end cover 231 is used to cover the opening of the housing 22 to form a contained space for accommodating the electrode assembly 21 and the electrolyte solution.

The end cover assembly 23 may further include an electrode terminal 232. The electrode terminal 232 is mounted on the end cover 231, and the electrode terminal 232 is used to be electrically connected to the tabs 212.

There may be one or more electrode terminals 232 in the end cover assembly 23. For example, in the battery cell 20, there are two end cover assemblies 23. In this case, there may be one electrode terminal 232 in the end cover assembly 23. The electrode terminal 232 in one end cover assembly 23 is a positive electrode terminal 232a, and the electrode terminal 232 in the other end cover assembly 23 is a negative electrode terminal 232b. For another example, as shown in FIG. 4, in the battery cell 20, there is one end cover assembly 23. In this case, there may be a plurality of electrode terminals 232 in the end cover assembly 23. For example, the end cover assembly 23 includes two electrode terminals 232, and the two electrode terminals 232 may be a positive electrode terminal 232a and a negative electrode terminal 232b. The positive electrode terminal 232a is used to be electrically connected to the positive tab 212a, and the negative electrode terminal 232b is used to be electrically connected to the negative tab 212b. In a length direction X of the end cover assembly 23, the positive electrode terminal 232a and the negative electrode terminal 232b may be distributed on the end cover 231 at intervals.

It should be noted that the electrode terminal 232 of the end cover assembly 23 may be electrically connected to the tabs 212 of the electrode assembly 21 in various manners. For example, the tabs 212 are directly connected to the electrode terminal 232 to realize electrical connection between the electrode terminal 232 and the tabs 212; for another example, the tabs 212 are indirectly connected to the electrode terminal 232 through an intermediate piece to realize electrical connection between the electrode terminal 232 and the tabs 212.

In some embodiments, please continue to refer to FIG. 4, the electrode terminal 232 may be indirectly connected to the tabs 212 through the current collecting member 233 to realize electrical connection between the electrode terminal 232 and the tabs 212.

For example, the end cover assembly 23 includes two electrode terminals 232, and the two electrode terminals 232 are the positive electrode terminal 232a and the negative electrode terminal 232b. The positive electrode terminal 232a may be electrically connected to the positive tab 212a through a current collecting member 233, and the negative electrode terminal 232b may be electrically connected to the negative tab 212b of the electrode assembly 21 through another current collecting member 233.

The current collecting member 233 may be a metal conductor, such as copper, iron, aluminum, stainless steel, and aluminum alloy. Both the electrode terminal 232 and the tabs 212 may be connected to the current collecting member 233 in various manners. For example, both the electrode terminal 232 and the tabs 212 are welded to the current collecting member 233.

In some embodiments, the end cover assembly 23 may further include a pressure relief mechanism 234, and the pressure relief mechanism 234 is mounted on the end cover 231 and is used to relieve a pressure inside the battery cell 20 when an internal pressure or a temperature of the battery cell 20 reaches a threshold.

The pressure relief mechanism 234 may be a component such as an explosion-proof valve, a rupture disc, a gas valve, or a pressure relief valve.

When the end cover assembly 23 includes two electrode terminals 232, in the length direction X of the end cover assembly 23, the pressure relief mechanism 234 may be arranged between the positive electrode terminal 232a and the negative electrode terminal 232b.

Figure 5:
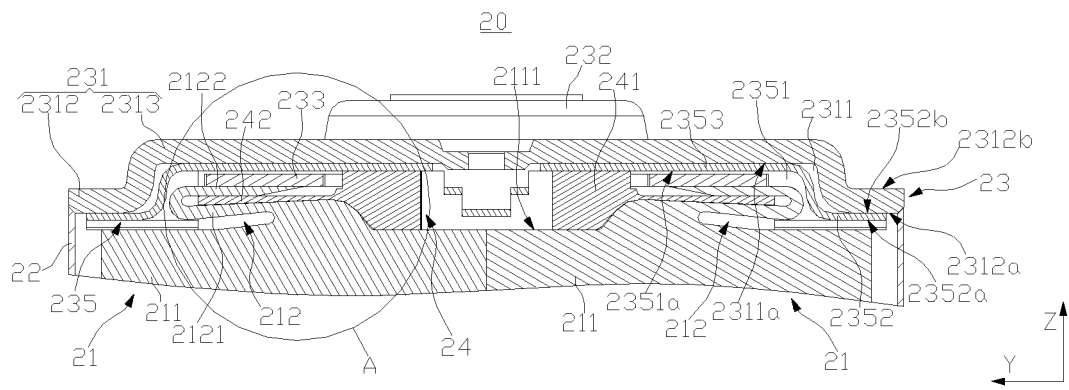
FIG. 5 is a partial sectioned diagram of a battery cell shown in FIG. 4.

In some embodiments, please refer to FIG. 5, FIG. 5 is a partial sectioned diagram of a battery cell 20 shown in FIG. 4. The end cover assembly 23 is provided with a first recessed portion 2351 facing the main body 211, and the first recessed portion 2351 is configured to accommodate at least a part of the support piece 24. This structure may reduce the space occupied by the support piece 24 inside the housing 22, so as to make more space for the main body 211 of the electrode assembly 21, which is beneficial to increase the energy density of the battery cell 20.

The first recessed portion 2351 is configured to accommodate at least a part of the support piece 24. It may be understood that the support piece 24 may be partially or entirely accommodated in the first recessed portion 2351. For example, in FIG. 5, a part of the support piece 24 is accommodated in the first recessed portion 2351.

In some embodiments, the first recessed portion 2351 is configured to accommodate at least a part of the tabs 212. It may be understood that the tabs 212 may be partially or entirely accommodated in the first recessed portion 2351. This structure may reduce the space occupied by the tabs 212 inside the housing 22, and is beneficial to increase the energy density of the battery cell 20.

Since both at least a part of the support piece 24 and at least a part of the tabs 212 are accommodated in the first recessed portion 2351, the support piece 24 and the tabs 212 may occupy a part of the space in the first recessed portion 2351, so as to reduce the amount of the electrolyte solution entering the first recessed portion 2351 when the battery cell 20 is inverted, and reduce the risk that a lifespan of the battery cell 20 is shortened due to insufficient electrolyte solution in the main body 211.

For example, in FIG. 5, a part of the tabs 212 is accommodated in the first recessed portion 2351.

In some embodiments, the main body 211 has a first end surface 2111, the first end surface 2111 of the main body 211 faces the bottom surface of the first recessed portion 2351, and the support piece 24 is configured to abut against the first end surface 2111 of the main body 211 and the bottom surface of the first recessed portion 2351. The abutting against herein may be a direct abutting against or an indirect abutting against. For example, FIG. 5 shows a situation where the support piece 24 directly abuts against bottom surfaces of the first end surface 2111 and the first recessed portion 2351.

For ease of description, the bottom surface of the first recessed portion 2351 is defined as a first bottom surface 2351a. For example, there is a distance between the first end surface 2111 and the end cover assembly 23, and the support piece 24 is located as a whole in the gap formed by the first bottom surface 2351a of the first recessed portion 2351 and the first end surface 2111.

The first end surface 2111 is an end surface of the main body 211 close to the end cover assembly 23, and the tabs 212 are connected to the first end surface 2111. The main body 211 and the other end opposite to the first end surface 2111 are used to abut against the bottom wall of the housing 22.

In some embodiments, when the electrode terminal 232 is connected to the tabs 212 through the current collecting member 233 to realize electrical connection between the electrode terminal 232 and the tabs 212, at least a part of the current collecting member 233 may be accommodated in the first recessed portion 2351, so as to reduce the space occupied by the current collecting member 233 inside the housing 22, and make more space for the main body 211, which is beneficial to increase the energy density of the battery cell 20.

At least a part of the current collecting member 233 is accommodated in the first recessed portion 2351, that is, a part of the current collecting member 233 may be accommodated in the first recessed portion 2351, or all of the current collecting member 233 is contained in the first recessed portion 2351.

In some embodiments, the first recessed portion 2351 may be disposed on the end cover 231, and the support piece 24 may directly abut against the end cover 231 and the main body 211 of the electrode assembly 21. In this case, the end cover 231 may be made of insulating material. Certainly, the first recessed portion 2351 of the end cover assembly 23 may also be disposed on other components of the end cover assembly 23.

In some embodiments, please continue to refer to FIG. 5, the end cover assembly 23 may further include an insulating piece 235. The insulating piece 235 is disposed on a side of the end cover 231 facing the main body 211, and the insulating piece 235 is configured to separate the end cover 231 and the electrode assembly 21. The first recessed portion 2351 is disposed on the insulating piece 235, the support piece 24 is located between the insulating piece 235 and the main body 211, and the support piece 24 abuts against the insulating piece 235 and the main body 211 to prevent the insulating piece 235 and the main body 211 from approaching each other.

The insulating piece 235 serves to separate the end cover 231 and the electrode assembly 21, and reduce the risk of battery cell 20 short circuit caused by contact between the end cover 231 and the electrode assembly 21.

In this embodiment, the insulating piece 235 is made of insulating material, and the insulating piece 235 may be made of rubber, plastic, or other materials. The end cover 231 may be made of metal, such as copper, iron, aluminum, stainless steel, and aluminum alloy.

In some embodiments, the insulating piece 235 may include a first body portion 2352 and a first protruding portion 2353. The first body portion 2352 has a first inner surface 2352a and a first outer surface 2352b that are arranged opposite to each other in the thickness direction Z of the first body portion 2352. The first protruding portion 2353 protrudes from the first outer surface 2352b along a direction departing from the main body 211, and the first recessed portion 2351 recessed from the first inner surface 2352a in the direction departing from the main body 211 is formed at a position corresponding to the first protruding portion 2353 on the first body portion 2352. The end cover 231 is provided with a second recessed portion 2311 facing the main body 211, and the second recessed portion 2311 is used to accommodate at least a part of the first protruding portion 2353.

On the one hand, the arrangement of the first protruding portion 2353 of the insulating piece 235 may strengthen the position where the first recessed portion 2351 is disposed on the first body portion 2352; on the other hand, the first recessed portion 2351 may be allowed to be recessed in the direction departing from the main body 211 as far as possible. In addition, since at least a part of the first protruding portion 2353 is accommodated in the second recessed portion 2311 of the end cover 231, this structure enables the structure of the insulating piece 235 and the end cover 231 to be more compact, so as to make more space for the main body 211 of the electrode assembly 21, which is beneficial to increase the energy density of the battery cell 20.

In some embodiments, in the thickness direction Z of the end cover assembly 23, a first bottom surface 2351a of the first recessed portion 2351 may be farther from the main body 211 than the first outer surface 2352b. In this structure, the first recessed portion 2351 is recessed into the first protruding portion 2353 in the direction departing from the main body 211, which increases a recess depth of the first recessed portion 2351.

In other embodiments, the first bottom surface 2351a of the first recessed portion 2351 may also be flush with the first outer surface 2352b; in other words, in the thickness direction Z of the end cover assembly 23, the first bottom surface 2351a of the first recessed portion 2351 is closer to the main body 211 than the first outer surface 2352b.

In some embodiments, please continue to refer to FIG. 5, the end cover 231 may include a second body portion 2312 and a second protruding portion 2313. The second body portion 2312 has a second inner surface 2312a and a second outer surface 2312b arranged opposite to each other in the thickness direction Z, and the second inner surface 2312a faces the first outer surface 2352b. The second protruding portion 2313 protrudes from the second outer surface 2312b along the direction departing from the main body 211, and the second recessed portion 2311 recessed from the second inner surface 2312a in the direction departing from the main body 211 is formed at a position corresponding to the second protruding portion 2313 on the second body portion 2312.

On the one hand, the arrangement of the second protruding portion 2313 of the end cover 231 may strengthen the position where the second recessed portion 2311 is disposed on the second body portion 2312; on the other hand, the second recessed portion 2311 may be allowed to be recessed in the direction departing from the main body 211 as far as possible.

The second inner surface 2312a faces the first outer surface 2352b, and there may be a distance between the second inner surface 2312a and the first outer surface 2352b, or the second inner surface 2312a may abut against the first outer surface 2352b. If there is a distance between the second inner surface 2312a and the first outer surface 2352b, a part of the first protruding portion 2353 is accommodated in the second recessed portion 2311; if the second inner surface 2312a abuts against the first outer surface 2352b, the first protruding portion are entirely accommodated in the second recessed portion 2311.

In this embodiment, the electrode terminal 232 may be mounted on the second body portion 2312 or the second protruding portion 2313. In FIG. 5, for example, the electrode terminal 232 is mounted on the second protruding portion 2313 to facilitate connection (for example, welding) between the electrode terminal 232 and the bus component 40.

For ease of description, the bottom surface of the second recessed portion 2311 is defined as a second bottom surface 2311a. In some embodiments, in the thickness direction Z of the end cover assembly 23, a second bottom surface 2311a of the second recessed portion 2311 is farther from the main body 211 than the second outer surface 2312b. In this structure, the second recessed portion 2311 is recessed into the second protruding portion 2313 in the direction departing from the main body 211, which increases a recess depth of the second recessed portion 2311.

In other embodiments, the second bottom surface 2311a of the second recessed portion 2311 may also be flush with the second outer surface 2312b; in other words, in the thickness direction Z of the end cover assembly 23, the second bottom surface 2311a of the second recessed portion 2311 is closer to the main body 211 than the second outer surface 2312b.

In some embodiments, please continue to refer to FIG. 5, the support piece 24 may include a support portion 241 and a partition portion 242, and the support portion 241 is configured to abut against the main body 211 in the thickness direction Z of the end cover assembly 23. The partition portion 242 is connected to one end of the support portion 241 in the width direction Y of the end cover assembly 23, and the tabs 212 are bent around the partition portion 242.

The support portion 241 abuts against the main body 211, and the support portion 241 serves to restrict the main body 211 to prevent the main body 211 from moving along a direction facing the end cover assembly 23. The partition portion 242 is connected to one end of the support portion 241, so that the tabs 212 can be conveniently bent and arranged on the partition portion 242, and the partition portion 242 serves to restrict the tabs 212 and prevents the tabs 212 from being inserted into the main body 211.

The support piece 24 may be made of insulating material, such as rubber or plastic.

For example, a part of the support portion 241 is accommodated in the first recessed portion 2351, and the partition portion 242 is entirely accommodated in the first recessed portion 2351.

That the support portion 241 abuts against the main body 211 may be that the support portion 241 directly abuts against the main body 211, or the support portion 241 indirectly abuts against the main body 211. In some embodiments, as shown in FIG. 5, in the thickness direction Z of the end cover assembly 23, one end of the support portion 241 directly abuts against the first end surface 2111 of the main body 211, and the other end of the support portion 241 directly abuts against the first bottom surface 2351a of the first recessed portion 2351. In other embodiments, in the thickness direction Z of the end cover assembly 23, one end of the support portion 241 directly abuts against the first end surface 2111 of the main body 211, and the other end of the support portion 241 does not abut against the first bottom surface 2351a of the first recessed portion 2351, and the other end of the support portion 241 is at a distance from the first bottom surface 2351a of the first recessed portion 2351. In this case, the partition portion 242 may abut against the first bottom surface 2351a of the first recessed portion 2351. For example, the partition portion 242 abuts against the first bottom surface 2351a of the first recessed portion 2351 through the tabs 212 and the current collecting member 233, so as to prevent the main body 211 from moving in a direction close to the end cover assembly 23.

The number of partition portions 242 is not limited, and there may be one or more partition portions 242, which mainly depends on the number of electrode assemblies.

In some embodiments, the tabs 212 include a first bending portion 2121 and a second bending portion 2122, where the first bending portion 2121 is located on a side of the partition portion 242 facing the main body 211, the second bending portion 2122 is connected to the first bending portion 2121, and the second bending portion 2122 is bent relative to the first bending portion 2121, where the second bending portion 2122 is located on a side of the partition portion 242 departing from the main body 211.

The first bending portion 2121 and the second bending portion 2122 connected to each other are respectively located on a side of the partition portion 242 facing the main body 211 and a side of the partition portion 242 departing from the main body 211. In other words, that the tabs 212 are bent around the partition portion 242 refers to be bent from one side of the partition portion 242 to the other side of the partition portion 242. The partition portion 242 has a good restrictive effect on the tabs 212, and prolongs the detour path of the tabs 212, so that the tabs 212 are not easily inserted into the main body 211.

The second bending portion 2122 is used to be electrically connected to the electrode terminal 232. For example, the tabs 212 are electrically connected to the electrode terminal 232 through the current collecting member 233, and the second bending portion 2122 and the current collecting member 233 may be stacked and welded together in the thickness direction Z of the end cover assembly 23.

That at least a part of the tabs 212 is accommodated in the first recessed portion 2351 may be that at least a part of the second bending portion 2122 is located in the first recessed portion 2351, and the first bending portion 2121 is located outside the first recessed portion 2351, or may also be that the second bending portion 2122 is entirely located in the first recessed portion 2351, and the first bending portion 2121 is at least partially located in the first recessed portion 2351. For example, in FIG. 5, the second bending portion 2122 is entirely located in the first recessed portion 2351, and a part of the first bending portion 2121 is located in the first recessed portion 2351.

Figure 6:
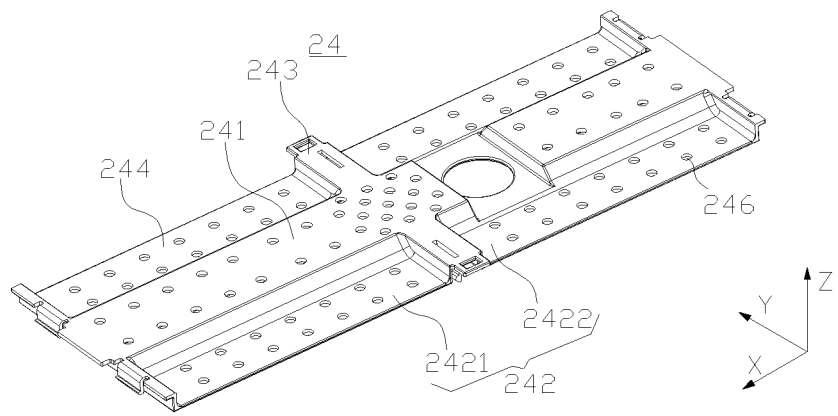
FIG. 6 is a front axonometric diagram of a support piece shown in FIG. 5.

In some embodiments, please refer to FIG. 6, FIG. 6 is a front axonometric diagram of the support piece 24 shown in FIG. 5. A projected area of the support portion 241 is larger than a projected area of the partition portion 242 in the thickness direction of the end cover assembly 23. The support portion 241 has a relatively large support range between the end cover assembly 23 and the main body 211. It is ensured that the support portion 241 has a good supporting capacity between the main body 211 and the end cover assembly 23, thereby preventing the support portion 241 from damaging the main body 211.

In some embodiments, the projected area of the support portion 241 is larger than 1/3 of a projected area of the support piece 24 in the thickness direction Z of the end cover assembly 23. In other words, 1/3 of the support piece 24 can support the main body 211. A contradiction area between the support piece 24 and the main body 211 is relatively large, thereby improving stability of the main body 211 in the housing 22.

In some embodiments, when the electrode assembly 21 (refer to FIG. 4) includes two tabs 212 with opposite polarities (refer to FIG. 4), that is, the electrode assembly 21 includes a positive tab 212a and a negative tab 212b, the two tabs 212 may be arranged side by side along the length direction X of the end cover assembly 23. The partition portion 242 includes a first part 2421 and a second part 2422 arranged side by side along the length direction X of the end cover assembly 23, and the two tabs 212 are bent around the first part 2421 and the second part 2422 respectively. The support piece 24 may further include a connection portion 243 located between the first part 2421 and the second part 2422, and the connection portion 243 is used to isolate the two tabs 212. The connection portion 243 can isolate the two tabs 212 with opposite polarities of the electrode assembly 21, and reduce a risk of short circuit caused by contact between the two tabs 212.

The connection portion 243 is connected to the first part 2421, the second part 2422, and the support portion 241. The connection portion 243, the partition portion 242, and the support portion 241 may be in an integrally formed structure.

For example, both the connection portion 243 and the support portion 241 are in a straight long structure, the connection portion 243 extends along the width direction Y of the end cover assembly 23, and the partition portion 242 extends along the length direction X of the end cover assembly 23.

Optionally, the connection portion 243 is used to abut against the main body 211 in the thickness direction Z of the end cover assembly 23. The connection portion 243 not only serves to isolate the two tabs 212 of the electrode assembly 21, but also supports the main body 211, and improves the stability of the main body 211 in the housing 22.

In some embodiments, the battery cell 20 includes a plurality of the electrode assemblies 21 stacked along the width direction Y of the end cover assembly 23. In the width direction Y of the end cover assembly 23, both ends of the support portion 241 are provided with the partition portion 242, tabs 212 of one group of the pluralities of electrode assemblies 21 are bent around the partition portion 242 located at one end of the support portion 241, and tabs 212 of another group of electrode assemblies 21 are bent around the partition portion 242 located at the other end of the support portion 241. In other words, the support piece 24 may restrict the tabs 212 of the plurality of electrode assemblies 21, thereby improving the safety of the battery 100.

A group of electrode assemblies 21 may be one electrode assembly 21 or a plurality of electrode assemblies 21.

For example, the end cover assembly 23 includes two electrode assemblies 21, the positive tab 212a of one electrode assembly 21 is bent around the first part 2421 located at one end of the support portion 241, and the negative tab 212b of the electrode assembly 21 is bent around the second part 2422 located at one end of the support portion 241. The positive tab 212a of the other electrode assembly 21 is bent around the first part 2421 located at the other end of the support portion 241, and the negative tab 212b of the other electrode assembly 21 is bent around the second part 2422 located at the other end of the support portion 241.

Figure 7:
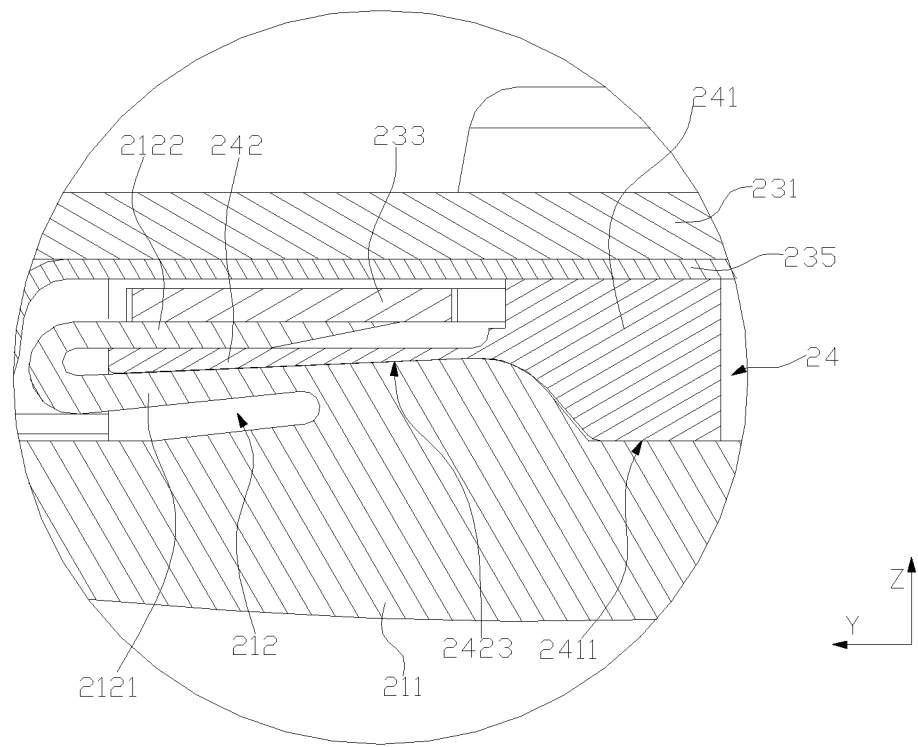
FIG. 7 is a partial enlarged diagram of A of a battery cell shown in FIG. 5.

In some embodiments, please refer to FIG. 6 and FIG. 7, FIG. 7 is a partial enlarged diagram of A of the battery cell 20 shown in FIG. 5. The support portion 241 has a first surface 2411 facing the main body 211, and the first surface 2411 is configured to abut against the main body 211. The partition portion 242 has a second surface 2423 facing the main body 211. In the thickness direction Z of the end cover assembly 23, the second surface 2423 is configured to be farther from the main body 211 than the first surface 2411 to form an accommodation portion 244. At least a part of the first bending portion 2121 is accommodated in the accommodation portion 244 so that the first surface 2411 abuts against the main body 211, and the space occupied by the first bending portion 2121 may be reduced, thereby increasing the energy density of the battery cell.

For example, on the support piece 24, the accommodation portion 244 may be formed at positions corresponding to the first part 2421 and the second part 2422, and the accommodation portion 244 corresponding to the first part 2421 may be enclosed by the first part 2421, the support portion 241, and the connection portion 243. The accommodation portion 244 corresponding to the second part 2422 may be an accommodation groove enclosed by the second part 2422, the support portion 241, and the connection portion 243.

Optionally, the accommodation portion 244 extends to the edge of the partition portion 242 along the width direction Y of the end cover assembly 23, so that the first bending portion 2121 is accommodated in the accommodation portion 244 when the tabs 212 are bent around the partition portion 242.

Optionally, the second surface 2423 is attached to the first bending portion 2121 to eliminate a gap between the first bending portion 2121 and the second surface 2423, so that a structure of the tabs 212 and the partition portion 242 is more compact.

In some embodiments, a size of the support portion 241 is larger than a size of the partition portion 242 in the thickness direction Z of the end cover assembly 23. In other words, the support portion 241 is thicker than the partition portion 242. The support portion 241 is thicker, so that the support portion 241 is not easily deformed, and it is further ensured that the support portion 241 has a better supporting capacity between the main body 211 and the end cover assembly 23. The thinner partition portion 242 enables the tabs 212 to have a shorter detour path, which is convenient for the tabs 212 to be bent and arranged on the partition portion 242.

Figure 8:
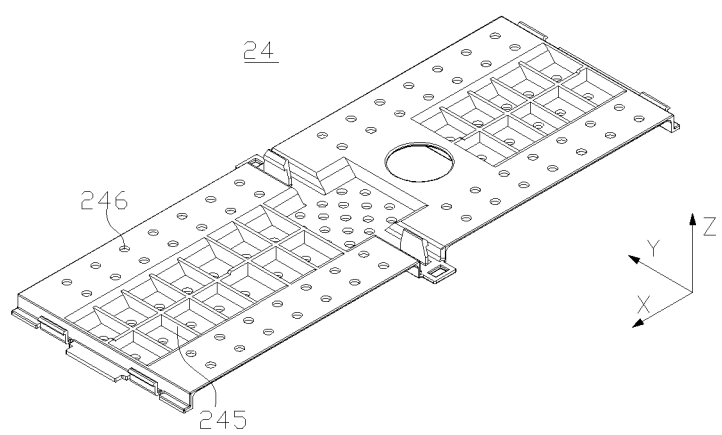
FIG. 8 is a back axonometric diagram of a support piece shown in FIG. 5.

In some embodiments, please refer to FIG. 8, FIG. 8 is a back axonometric diagram of the support piece 24 shown in FIG. 5. The side of the support piece 24 facing the end cover assembly 23 (not shown in FIG. 5) has a reinforcement portion 245 to enhance the strength of the support piece 24, so that the support portion 241 is not easily deformed when the main body 211 abuts against the support portion 241, thereby improving the supporting capacity of the support piece 24 between the main body 211 and the end cover assembly 23.

For example, the side of the support piece 24 facing the end cover assembly 23 is provided with a groove, the groove is recessed into the support portion 241, and the reinforcement portion 245 is located in the groove to strengthen the support portion 241. The reinforcement portion 245 may be formed by a plurality of plate-shaped pieces crisscrossed.

In some embodiments, the support piece 24 is provided with a plurality of through holes 246 passing through the support piece 24, and the through holes 246 are used for allowing the electrolyte solution in the housing 22 to flow into the main body 211, that is, the electrolyte solution inside the housing 22 may enter into the main body 211 through the through holes 246, which is beneficial for the electrolyte solution in the housing 22 to enter into the main body 211. In addition, the support piece 24 is provided with a plurality of through holes 246, which is equivalent to removing a part of the material of the support piece 24, and is beneficial to reduce a weight of the support piece 24.

For example, the through hole 246 penetrates the support piece 24 along the thickness direction Z of the support piece 24. The thickness direction Z of the support piece 24 is consistent with the thickness direction Z of the end cover assembly 23.

It should be noted that in the embodiments of this application, the thickness direction Z of the end cover assembly 23 is the thickness direction Z of the end cover 231, the length direction X of the end cover assembly 23 is the length direction X of the end cover 231, and the width direction Y of the end cover assembly 23 is the width direction Y of the end cover 231.

Figure 9:
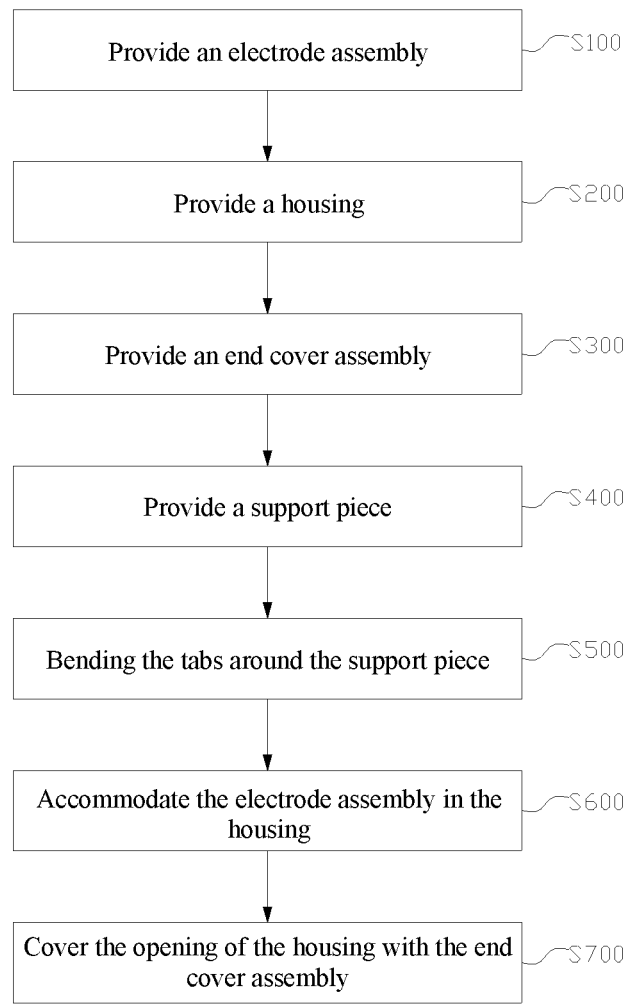
FIG. 9 is a flowchart of a battery cell manufacturing method according to some embodiments of this application.

The embodiments of this application further provide a battery cell 20 manufacturing method. Please refer to FIG. 9, FIG. 9 is a flowchart of a battery cell 20 manufacturing method according to some embodiments of this application. The method includes:

S100: Provide an electrode assembly 21, where the electrode assembly 21 includes a main body 211 and tabs 212.

S200: Provide a housing 22 with an opening.

S300: Provide an end cover assembly 23.

S400: Provide a support piece 24.

S500: Bending the tabs 212 around the support piece 24.

S600: Accommodate the electrode assembly 21 in the housing 22.

S700: Cover the opening of the housing 22 with the end cover assembly 23.

The support piece 24 is located between the end cover assembly 23 and the main body 211, and the support piece 24 is configured to prevent the main body 211 from moving along a direction facing the end cover assembly 23.

In the foregoing method, a sequence of steps S100, S200, S300, and S400 is not limited. For example, step S400 may be performed first, and then step S300, step S200, and step S100 are performed in sequence.

It should be noted that, for relevant structures of the battery cell 20 manufactured through the battery cell 20 manufacturing method provided in the foregoing embodiments, please refer to the battery cell 20 provided in the foregoing embodiments.

Figure 10:
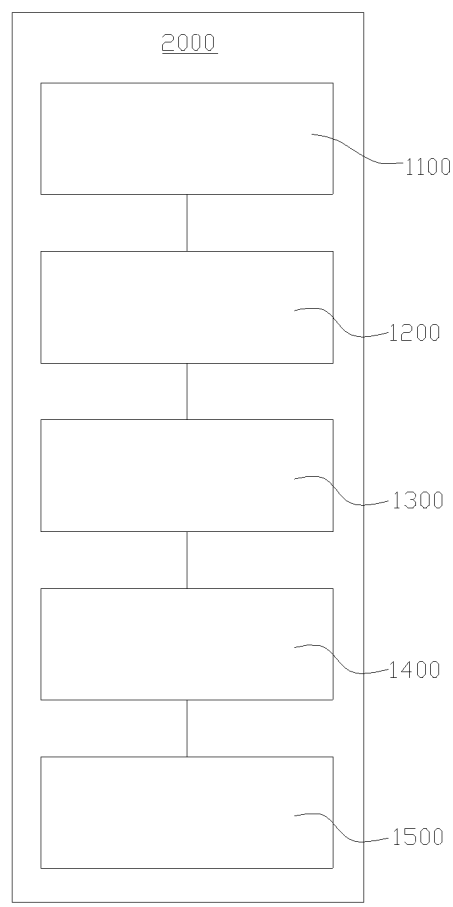
FIG. 10 is a schematic block diagram of a battery cell manufacturing device according to some embodiments of this application.

In addition, the embodiments of this application further provide a battery cell 20 manufacturing device 2000. Please refer to FIG. 10, FIG. 10 is a schematic block diagram of the battery cell 20 manufacturing device 2000 according to some embodiments of this application. The manufacturing device 2000 includes a first providing apparatus 1100, a second providing apparatus 1200, a third providing apparatus 1300, a fourth providing apparatus 1400, and an assembling apparatus 1500.

The first providing apparatus 1100 is used to provide an electrode assembly 21, where the electrode assembly 21 includes a main body 211 and tabs 212. The second providing apparatus 1200 is used to provide a housing 22 with an opening. The third providing apparatus 1300 is used to provide an end cover assembly 23. The fourth providing apparatus 1400 is used to provide a support piece 24. The assembling apparatus 1500 is used to bend the tabs 212 around the support piece 24 and cover the opening with the end cover assembly 23.

The support piece 24 is located between the end cover assembly 23 and the main body 211, and the support piece 24 is configured to prevent the main body 211 from moving along a direction facing the end cover assembly 23.

It should be noted that, for relevant structures of the battery cell 20 manufactured through the battery cell 20 manufacturing device 2000 provided in the foregoing embodiments, please refer to the battery cell 20 provided in the foregoing embodiments.

It should be noted that the embodiments in this application and features in the embodiments may be combined with each other if there is no conflict.

The foregoing embodiments are only used to illustrate the technical solutions of this application, and are not used to limit this application. For a person skilled in the art, this application may have various modifications and changes. Any modification, equivalent replacement and improvement made within the spirit and principle of this application shall be included in the protection scope of this application.

What is claimed is:

1. A battery cell, comprising:
    an electrode assembly, comprising a main body and tabs;
    a housing with an opening, wherein the housing is used to accommodate the electrode assembly;
    an end cover assembly used to cover the opening; and
    a support piece located between the main body and the end cover assembly, wherein the tabs are bent around the support piece, and the support piece is configured to prevent the main body from moving along a direction facing the end cover assembly;
    wherein the end cover assembly is provided with a first recessed portion facing the main body, and the first recessed portion is configured to accommodate at least a part of the support piece;
    wherein the first recessed portion is configured to accommodate at least a part of the tab.

2. The battery cell according to claim 1, wherein the support piece comprises:
    a support portion for abutting against the main body along a thickness direction of the end cover assembly; and
    a partition portion, wherein the tabs are bent around the partition portion, and in a width direction of the end cover assembly, the partition portion is connected to one end of the support portion.

3. The battery cell according to claim 2, wherein a projected area of the support portion is larger than a projected area of the partition portion in the thickness direction of the end cover assembly.

4. The battery cell according to claim 2, wherein a size of the support portion is larger than a size of the partition portion in the thickness direction of the end cover assembly.

5. The battery cell according to claim 2, wherein one side of the support piece facing the end cover assembly has a reinforcement portion, and the reinforcement portion is used to enhance strength of the support piece;
    wherein the side of the support piece facing the end cover assembly is provided with a groove, the groove is recessed into the support portion, and the reinforcement portion is located in the groove.

6. The battery cell according to claim 2, wherein the tabs comprise:
    a first bending portion, wherein the first bending portion is located on a side of the partition portion facing the main body; and
    a second bending portion connected to the first bending portion and bent relative to the first bending portion, wherein the second bending portion is located on a side of the partition portion departing from the main body.

7. The battery cell according to claim 1, wherein the end cover assembly comprises:
    an end cover used to cover the opening; and
    an insulating piece disposed on a side of the end cover facing the main body, wherein the insulating piece is configured to isolate the end cover from the electrode assembly, the first recessed portion is disposed on the insulating piece, the support piece is located between the insulating piece and the main body, and the support piece abuts against the insulating piece and the main body.

8. The battery cell according to claim 7, wherein the insulating piece comprises:
    a first body portion, wherein the first body portion has a first inner surface and a first outer surface that are arranged opposite to each other in the thickness direction of the end cover assembly; and
    a first protruding portion, wherein the first protruding portion protrudes from the first outer surface along a direction departing from the main body, and the first recessed portion recessed from the first inner surface in the direction departing from the main body is formed at a position corresponding to the first protruding portion on the first body portion; and
    the end cover is provided with a second recessed portion facing the main body, and the second recessed portion is used to accommodate at least a part of the first protruding portion.

9. The battery cell according to claim 8, wherein in the thickness direction of the end cover assembly, a bottom surface of the first recessed portion is farther from the main body than the first outer surface.

10. The battery cell according to claim 8, wherein the end cover comprises:
    a second body portion, wherein the second body portion has a second inner surface and a second outer surface that are arranged opposite to each other in the thickness direction of the end cover assembly, and the second inner surface faces the first outer surface; and
    a second protruding portion, wherein the second protruding portion protrudes from the second outer surface along the direction departing from the main body, and the second recessed portion recessed from the second inner surface in the direction departing from the main body is formed at a position corresponding to the second protruding portion on the second body portion.

11. The battery cell according to claim 10, wherein in the thickness direction of the end cover assembly, a bottom surface of the second recessed portion is farther from the main body than the second outer surface.

12. A battery, comprising:
    the battery cell according to claim 1; and
    a box body used to accommodate the battery cell.

13. An electrical device, comprising the battery according to claim 12.

* * * * *